April 2, 1929.  A. C. SAVIDGE  1,707,670
VALVE FACING TOOL
Filed Oct. 22, 1923
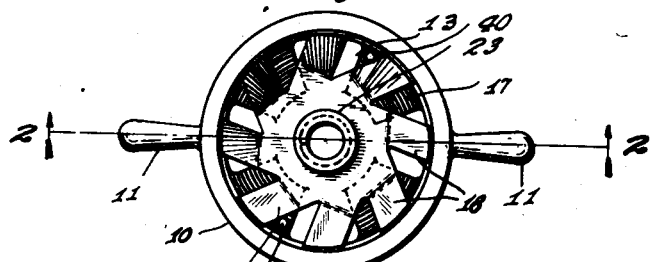
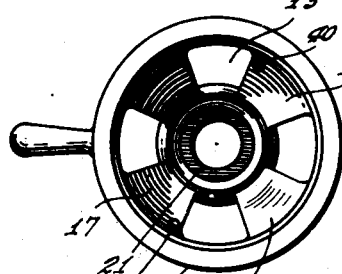
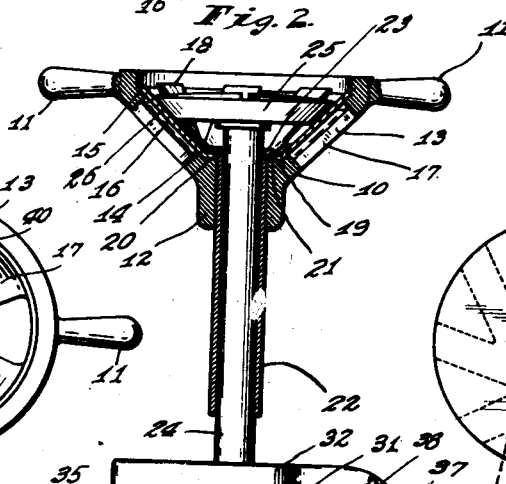
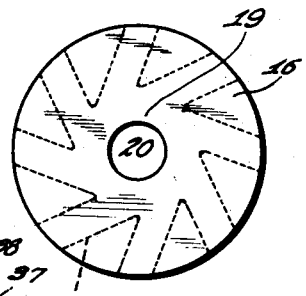
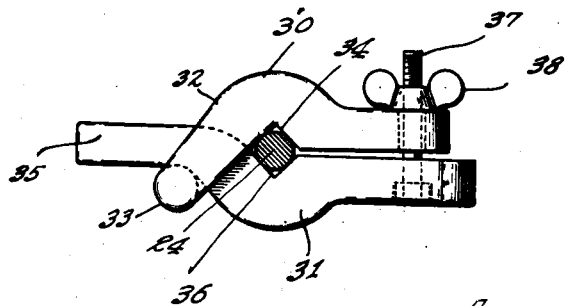
INVENTOR.
ALBERT C. SAVIDGE,
BY
ATTORNEY.

Patented Apr. 2, 1929.

1,707,670

UNITED STATES PATENT OFFICE.

ALBERT C. SAVIDGE, OF INDIANAPOLIS, INDIANA.

VALVE-FACING TOOL.

Application filed October 22, 1923. Serial No. 669,890.

It is the object of my invention to produce a valve facing tool inexpensively, for re-surfacing various valves but especially the valves of internal combustion engines; and to provide in such a valve facing tool an effective sheet-metal cutting element, of such low cost that it can be discarded economically when dull, while at the same time it can be re-sharpened inexpensively if that is desired. It is a further object to make the cutting element yieldable to some extent, if desired, so that when a tooth is dull it yields to permit the continued operation of the teeth which are not yet dull. A still further object is to arrange the teeth of the cutting element so that they tend to hold the cutting element to the valve, and thus lessen the labor of the operator and make a smoother surface on the valve.

In accomplishing these objects, I provide a main supporting frame or casing which is fairly rigid, and in this frame I mount a toothed sheet-metal cutting element, which is held in place by a holding device which also preferably serves as a guide for the valve-stem. The sheet-metal cutting element is held firm for its cutting operation by the rigid casing in which it is mounted; which casing preferably has holes through it for allowing the cuttings to fall out. The teeth of the sheet-metal cutting element are preferably arranged so that their cutting faces are oblique to the radii which pass through them, with the outer end of each cutting edge angularly in advance of the inner edge thereof with respect to the direction of rotation of the cutting element when in operation, although such arrangement is not necessary. In addition, I provide a grip-providing clamp for the stem of the valve, for rotating it and the valve by hand with relation to the casing and cutting element, which casing is held by the other hand of the operator.

The accompanying drawing illustrates my invention: Fig. 1 is a plan of a valve facing tool embodying my invention; Fig. 2 is a longitudinal central section, substantially on the line 2—2 of Fig. 1; Fig. 3 is a transverse section substantially on the line 3—3 of Fig. 2, showing the clamp for the valve-stem; Fig. 4 is a plan of the casing, without the cutting element, but with the valve-stem guide-tube in place; and Fig. 5 is a plan of a sheet-metal blank from which the cutting element is made, with the outline of the cutting element indicated thereon in dotted lines.

My valve facing tool includes a casing 10, in the general shape of a frustum of a cone, with outwardly projecting handles 11 at its larger end, and with a cylindrical guide sleeve 12 at its smaller end. The conical walls of this casing 10 are provided with any desired number of openings 13, for permitting the cuttings to drop through. On the inner conical face of the casing 10, both radially inside and radially outside of the annular series of openings 13, there are relatively raised annular shoulders 14 and 15. These shoulders support the inner and outer parts of the cutting element 16 and fix the angle which is imparted to the valve face. The shoulders 15 and 16 are slightly higher than are the inner faces of the spokes 17 between the openings 13, so that there will be a slight space between the cutting element 16 and such spoke-faces. This space permits the cuttings to reach the openings 13 easily, without clogging the device.

The cutting element 16 is made of sheet-metal. It is preferably made from a disk blank, as shown in Fig. 5, which blank is stamped out to form the teeth 18 of the cutting element. These teeth are not radial teeth, in the preferred construction, but are so set at an oblique angle to the radii at their bases that their outer ends are farther advanced than are their inner ends with respect to the direction of cutting rotation of the cutting element. After the cutting element 16 has its teeth cut, such teeth and the ring within them are shaped to form a cone, with a small flat annular inner part 19 around the central hole 20, with which the cutting element is provided. This flat annular central part 19 lies against a similar flat annular central face 21 on the casing 10, while the conical part of the cutting element is preferably shaped to fit the inner conical face of such casing. The angle of these conical parts of the casing and cutting element corresponds to that of the valve to be dressed, and varies for different valves. In forming the teeth 18 of the cutting element 16, the cutting edges, or those in the clockwise direction in Fig. 5, are bent slightly farther upward than are the rear or non-cutting edges, which are on the counter-clockwise side of the teeth as viewed in Fig. 5. This makes for clearance in the cutting operation. When the cutting element 16 has been properly shaped, it may be suitably sharpened and hardened.

In order to hold the cutting element 16 in place in the casing 10, I provide a guide-tube 22, with a flange 23 at one end. The guide-tube 22 is preferably of such external size that it fits slidingly within the central hole through the guide sleeve 12 of the casing 10, though it may be a tight fit if the cutting element is not to be replaceable; and is of such size internally that it slidingly receives the stem 24 of the valve 25 which is to be faced to provide a proper surface 26 on it. The flange 23 overlies the central flat annular part 19 of the cutting element, and holds it against the surface 21 of the casing 10.

The guide-tube 22 serves as a guide for the valve-stem 24; and such valve-stem projects beyond the end of the tube 22, so that it may there have attached to it a grip-providing clamp which the operator may grasp to turn the valve and the casing relatively to each other. This clamp for the valve-stem comprises two mating parts 30 and 31. The part 30 has two spaced legs 32, which are joined by cross-bars 33 at both ends, and both of which have notches 34 for fitting upon the valve-stem 24. The part 31 of the clamp lies in a plane midway between the two legs 32 of the part 30, and has an outwardly projecting finger 35 which bears against one of the cross-bars connecting the two legs of the part 30. The part 31 also has a V-shaped notch 36, mating with the notches 32 but arranged to engage the valve-stem 24 on the other side. The two free ends of the parts 30 and 31 are provided with any suitable tightening device, such as a screw 37 provided with a wing-nut 38. The clamping device is slipped on the valve-stem 24, with the latter lying in the notches 32 and 36, and then tightened thereon by screwing up the wing-nut 38.

In operation, a cutting element 16, preferably a sharp one, is placed in the casing 10, with its central part resting on the shoulder 14 and face 21 and the outer ends of its teeth 18 resting on the shoulder 15; and the guide-tube 22 is then inserted through the hole 20 of the cutting element and through the guide sleeve 12 of the casing. The valve 25 to be re-faced is removed from the engine and its valve-stem 24 is inserted through the guide-tube 22 so that the conical face 26 of the valve will lie against the cutting element 16. The projecting end of the valve-stem 24 has the clamp 30—31 attached to it, in the manner already described.

Then the operator grasps the casing 10 in one hand, and the clamp 30—31 in the other, and rotates the two relatively to each other, at the same time pulling as in drawing a cork out of a bottle. This makes the valve-stem 24 move relatively to the cutting element 16, so that the cutting edges of the teeth 18 plane off the surface 26 of the valve 25. In doing this, it is not necessary that the operator exert great pulling force between the two parts gripped; for the slant of the edges of the teeth 18 is such that when the cutting starts the teeth tend to feed themselves into the surface 26.

While ordinarily friction will be sufficient to hold the cutting element 16 from turning in the casing 10, such friction may be supplemented when desired by any suitable positive means for preventing such turning. For example, one or more pins 40 may be provided in this shoulder 15 or spokes 17, for the engaging teeth 18 near their outer ends.

If a cutting element 15 becomes dull, it may readily be taken out and thrown away, and a new one substituted for it something in the manner of a safety-razor blade. It is not necessary, however, to throw a cutting element away when dull, for it may readily be re-sharpened by an ordinary thin grinding wheel, to which the proper edges of the teeth 18 may readily be applied. If only some of the teeth of the cutting element become dull, they spring away slightly from the face 26 of the valve, and permit the teeth which are still sharp to do their work.

In thus re-surfacing the face 26, it is not necessary that the operator exercise great care, for the parts are held in relative proper position by the co-operation of the guide-tube 22 with the guide sleeve 12 and valve-stem 24. The re-facing operation may be made by turning the valve continuously in one direction in the casing 10, or by operating it back and forth; but the latter movement is probably the easier. In such operation back and forth, the teeth 18 slide idly over the face 26 when turned in the non-cutting direction.

I claim as my invention:

1. A valve facing tool, comprising a supporting casing provided with a valve-facing cutting element and with a valve-stem guide, and a clamp for gripping a valve-stem projecting from said valve-stem guide, said cutting element having a peripheral series of notches corresponding sides of which form cutting edges, said notches extending to the periphery of said cutting element.

2. The combination set forth in claim 1, with the addition that said casing and said clamp are suitable to be grasped in the two hands of the operator and turned relatively to each other while being pulled apart to engage the valve-head with the cutting element.

3. A valve-facing tool, comprising a supporting casing, a toothed sheet-metal cutting element removably mounted therein in position to engage the face of the valve, and a guide-tube for guiding the valve stem and positioning the cutting element in the casing, the teeth of said cutting element being supported by said casing to fix the facing angle of said teeth.

4. A valve facing tool, comprising a supporting casing, and a toothed sheet-metal cutting element removably mounted therein in position to engage the face of the valve, the teeth of said cutting element being supported at their inner and outer ends in said casing but being spaced from the casing at intermediate points of their length.

5. The combination set forth in claim 3, with the addition that said casing has a guide sleeve in which said guide-tube is removably mounted, and that said guide-tube has a flange at one end for overlying the inner part of said cutting element.

6. A valve-facing tool, comprising a supporting casing provided with a removable valve-facing cutting element and with a valve-stem guide, and a clamp for gripping a valve-stem projecting from said valve-stem guide, said valve-stem guide being removable and serving when in place to position the cutting element in the casing.

7. A valve-facing tool, comprising a supporting casing, and a toothed sheet-metal cutting element removably mounted therein in position to engage the face of the valve, said casing supporting both the center and periphery of said cutting element and having holes in it for allowing the cuttings to fall through.

8. A valve-facing tool, comprising a supporting casing, and a toothed sheet-metal cutting element removably mounted therein in position to engage the face of the valve, the teeth of said cutting element being supported by said casing to fix the facing angle of said teeth, said teeth being oblique with respect to the cutting element radii through their inner ends and having their outer ends farther angularly advanced in the direction of cutting rotation than are their inner ends.

9. The combination set forth in claim 4, with the addition that said casing has openings through it behind the intermediate portions of said teeth.

In witness whereof, I have hereunto set my hand at Indianapolis, Indiana, this 26th day of July, A. D. one thousand nine hundred and twenty-three.

ALBERT C. SAVIDGE.